United States Patent
Sakhnini et al.

(10) Patent No.: US 12,341,643 B2
(45) Date of Patent: Jun. 24, 2025

(54) CONTROL AND DATA CHANNEL PROCESSING FOR HIGHER BANDS

(71) Applicant: QUALCOMM Incorporated, San Diego, CA (US)

(72) Inventors: Iyab Issam Sakhnini, San Diego, CA (US); Tao Luo, San Diego, CA (US); Jing Sun, San Diego, CA (US); Xiaoxia Zhang, San Diego, CA (US); Jun Ma, San Diego, CA (US); Hemant Saggar, Irvine, CA (US); Morteza Soltani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 325 days.

(21) Appl. No.: 17/503,900

(22) Filed: Oct. 18, 2021

(65) Prior Publication Data
US 2023/0123276 A1    Apr. 20, 2023

(51) Int. Cl.
*H04L 27/26* (2006.01)
*H04L 25/02* (2006.01)
*H04W 72/23* (2023.01)
*H04W 52/54* (2009.01)

(52) U.S. Cl.
CPC ........ *H04L 27/265* (2013.01); *H04L 25/0242* (2013.01); *H04W 72/23* (2023.01); *H04W 52/54* (2013.01)

(58) Field of Classification Search
None
See application file for complete search history.

(56) References Cited

U.S. PATENT DOCUMENTS

| | | | |
|---|---|---|---|
| 10,218,548 B1* | 2/2019 | Löhning | H04L 7/0012 |
| 10,218,549 B1* | 2/2019 | Löhning | H04L 7/00 |
| 2008/0219236 A1* | 9/2008 | Love | H04L 5/0007 370/347 |
| 2010/0027450 A1* | 2/2010 | Montojo | H04W 52/286 370/311 |
| 2014/0362701 A1* | 12/2014 | Roh | H03M 13/2966 370/235 |
| 2018/0049173 A1* | 2/2018 | Chen | H04W 76/28 |
| 2019/0124682 A1* | 4/2019 | Takeda | H04W 74/08 |
| 2020/0076670 A1* | 3/2020 | Liu | H04L 1/1664 |
| 2020/0100241 A1* | 3/2020 | Takeda | H04L 5/0007 |
| 2020/0145271 A1* | 5/2020 | Bala | H04L 1/0606 |
| 2020/0235894 A1* | 7/2020 | Takeda | H04L 5/0051 |
| 2020/0260450 A1* | 8/2020 | Ji | H04L 5/0091 |
| 2020/0287679 A1* | 9/2020 | Sun | H04L 5/0048 |

(Continued)

*Primary Examiner* — Clemence S Han
(74) *Attorney, Agent, or Firm* — Holland & Hart LLP

(57) ABSTRACT

Methods, systems, and devices for wireless communications are described. A wireless device such as a user equipment (UE) may receive control signaling from a scheduling device such as a base station which indicates a configuration for decoding control channel information at the UE using a single discrete transform process. In such cases, the configuration may be for decoding control channel information such as downlink control information (DCI) that is time multiplexed with data channel information in one or more symbols of a single carrier waveform. Using the configuration, the UE may decode the control channel information and the data channel information using the discrete transform process.

30 Claims, 15 Drawing Sheets

(56) References Cited

U.S. PATENT DOCUMENTS

| | | | | |
|---|---|---|---|---|
| 2020/0396744 | A1* | 12/2020 | Xiong | H04L 5/0051 |
| 2020/0403835 | A1* | 12/2020 | Matsumura | H04W 72/23 |
| 2021/0021450 | A1* | 1/2021 | Zhang | H04L 27/2636 |
| 2021/0022044 | A1* | 1/2021 | Zhang | H04W 28/20 |
| 2021/0058207 | A1* | 2/2021 | Lee | H04L 5/0007 |
| 2021/0084634 | A1* | 3/2021 | Li | H04L 5/0048 |
| 2021/0092756 | A1* | 3/2021 | Takeda | H04L 5/0044 |
| 2022/0078767 | A1* | 3/2022 | Xiong | H04L 5/0092 |
| 2022/0217756 | A1* | 7/2022 | Wu | H04L 5/0055 |
| 2022/0263697 | A1* | 8/2022 | Ma | H04L 27/2636 |
| 2022/0352943 | A1* | 11/2022 | Niu | H04W 36/0022 |
| 2022/0361218 | A1* | 11/2022 | He | H04L 5/0053 |
| 2023/0101410 | A1* | 3/2023 | Cheng | H04L 27/26025 |
| | | | | 375/262 |

\* cited by examiner

CONTROL AND DATA CHANNEL PROCESSING FOR HIGHER BANDS

FIELD OF TECHNOLOGY

The following relates to wireless communications, including control and data channel processing for higher bands.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems such as 5G/NR wireless systems may support signaling on high frequency bands. To further support high frequency communications, devices may employ a number of different techniques including signaling of single carrier waveforms. In some cases, however, operations in higher bands using single carrier waveforms may be associated with increased subcarrier spacing, which shortens symbols and increases communications complexity at a UE.

SUMMARY

The described techniques relate to improved methods, systems, devices, and apparatuses that support control and data channel processing for higher bands. Generally, the described techniques support communications in high frequency bands in which wireless communications devices may support signaling using a number of different waveforms such as single carrier waveforms. In some cases, however, high frequency communications using single carrier waveforms may have increased subcarrier spacings, which shortens both symbols and slots used to carry control and data information. Shortened symbol timing may reduce the time a device such as a user equipment (UE) has to decode and process downlink control information (DCI).

To accommodate larger subcarrier spacing and shortened symbols of single carrier waveforms used in higher bands, the UE may receive control signaling indicating a configuration for decoding control channel information and shared channel information using a single discrete Fourier transform (DFT) processing duration. In such cases, the control channel information may be time multiplexed with data channel information in a single scheduled entity, and the UE may use a single DFT processing duration to decode both the control channel and the shared channel information.

A method for wireless communications at a UE is described. The method may include receiving control signaling indicating a configuration for decoding control channel information at the UE using a single discrete transform process, where the configuration is for decoding control channel information that is time multiplexed with data channel information in one or more symbols of a single carrier waveform and decoding the control channel information and the data channel information using the single discrete transform process in accordance with the configuration.

An apparatus for wireless communications at a UE is described. The apparatus may include a processor, memory coupled with the processor, and instructions stored in the memory. The instructions may be executable by the processor to cause the apparatus to receive control signaling indicating a configuration for decoding control channel information at the UE using a single discrete transform process, where the configuration is for decoding control channel information that is time multiplexed with data channel information in one or more symbols of a single carrier waveform and decode the control channel information and the data channel information using the single discrete transform process in accordance with the configuration.

Another apparatus for wireless communications at a UE is described. The apparatus may include means for receiving control signaling indicating a configuration for decoding control channel information at the UE using a single discrete transform process, where the configuration is for decoding control channel information that is time multiplexed with data channel information in one or more symbols of a single carrier waveform and means for decoding the control channel information and the data channel information using the single discrete transform process in accordance with the configuration.

A non-transitory computer-readable medium storing code for wireless communications at a UE is described. The code may include instructions executable by a processor to receive control signaling indicating a configuration for decoding control channel information at the UE using a single discrete transform process, where the configuration is for decoding control channel information that is time multiplexed with data channel information in one or more symbols of a single carrier waveform and decode the control channel information and the data channel information using the single discrete transform process in accordance with the configuration.

In some examples of the method, apparatuses, and non-transitory computer-readable medium described herein, decoding the control channel information and the data channel information using the single discrete transform process may include operations, features, means, or instructions for performing a single channel estimation procedure for the control channel information and the data channel information over the one or more symbols based on the configuration.

In some examples of the method, apparatuses, and non-transitory computer-readable medium described herein, the single discrete transform process includes a single guard interval associated with the control channel information and the data channel information in the one or more symbols.

In some examples of the method, apparatuses, and non-transitory computer-readable medium described herein, the single discrete transform process includes a single cyclic prefix associated with the control channel information and the data channel information in the one or more symbols.

Some examples of the method, apparatuses, and non-transitory computer-readable medium described herein may further include operations, features, means, or instructions for decoding the control channel information and the data channel information in a single symbol using the single discrete transform process in accordance with the configuration.

Some examples of the method, apparatuses, and non-transitory computer-readable medium described herein may further include operations, features, means, or instructions for decoding the control channel information and the data channel information in adjacent symbols using the single discrete transform process and in accordance with the configuration, where the control channel information may be included in a first symbol and the data channel information may be included in a second symbol.

Some examples of the method, apparatuses, and non-transitory computer-readable medium described herein may further include operations, features, means, or instructions for operating using a first power level during the first symbol and a second power level during the second symbol based on the configuration, where the first power level may be different from the second power level.

In some examples of the method, apparatuses, and non-transitory computer-readable medium described herein, the single discrete transform process may be associated with a scheduling block in which the control channel information may be contiguous with the data channel information and a guard period within the scheduling block.

In some examples of the method, apparatuses, and non-transitory computer-readable medium described herein, the control channel information corresponds to the data channel information and further corresponds to information associated with at least one additional data channel and the method, apparatuses, and non-transitory computer-readable medium may include further operations, features, means, or instructions for decoding the control channel information, the data channel information, and the information associated with at least one future data channel in accordance with the configuration, where the control channel information may be associated with the data channel information and the at least one future data channel.

Some examples of the method, apparatuses, and non-transitory computer-readable medium described herein may further include operations, features, means, or instructions for decoding the control channel information, the data channel information, and the information associated with the at least one additional data channel based on the control channel information and additional control channel information received in a prior symbol.

Some examples of the method, apparatuses, and non-transitory computer-readable medium described herein may further include operations, features, means, or instructions for receiving the control channel information and the data channel information in accordance with a single transmission configuration indicator state.

In some examples of the method, apparatuses, and non-transitory computer-readable medium described herein, the single discrete transform process includes one or more demodulation reference signals (DMRSs) that may be multiplexed with the control channel information and the data channel information and the method, apparatuses, and non-transitory computer-readable medium may include further operations, features, means, or instructions for performing channel estimation for the control channel information and the data channel information in the one or more DMRSs during the single discrete transform process.

In some examples of the method, apparatuses, and non-transitory computer-readable medium described herein, one or more symbol gaps may be included between symbols of the one or more DMRSs, the control channel information, and the data channel information.

In some examples of the method, apparatuses, and non-transitory computer-readable medium described herein, the control channel information includes a single DCI associated with the UE or multiple DCI associated with at least the UE and one or more additional UEs.

In some examples of the method, apparatuses, and non-transitory computer-readable medium described herein, the control channel information and the data channel information may be multiplexed on the single carrier waveform.

In some examples of the method, apparatuses, and non-transitory computer-readable medium described herein, the single discrete transform process includes a discrete Fourier transform (DFT) processing duration.

DETAILED DESCRIPTION

Figure 1:
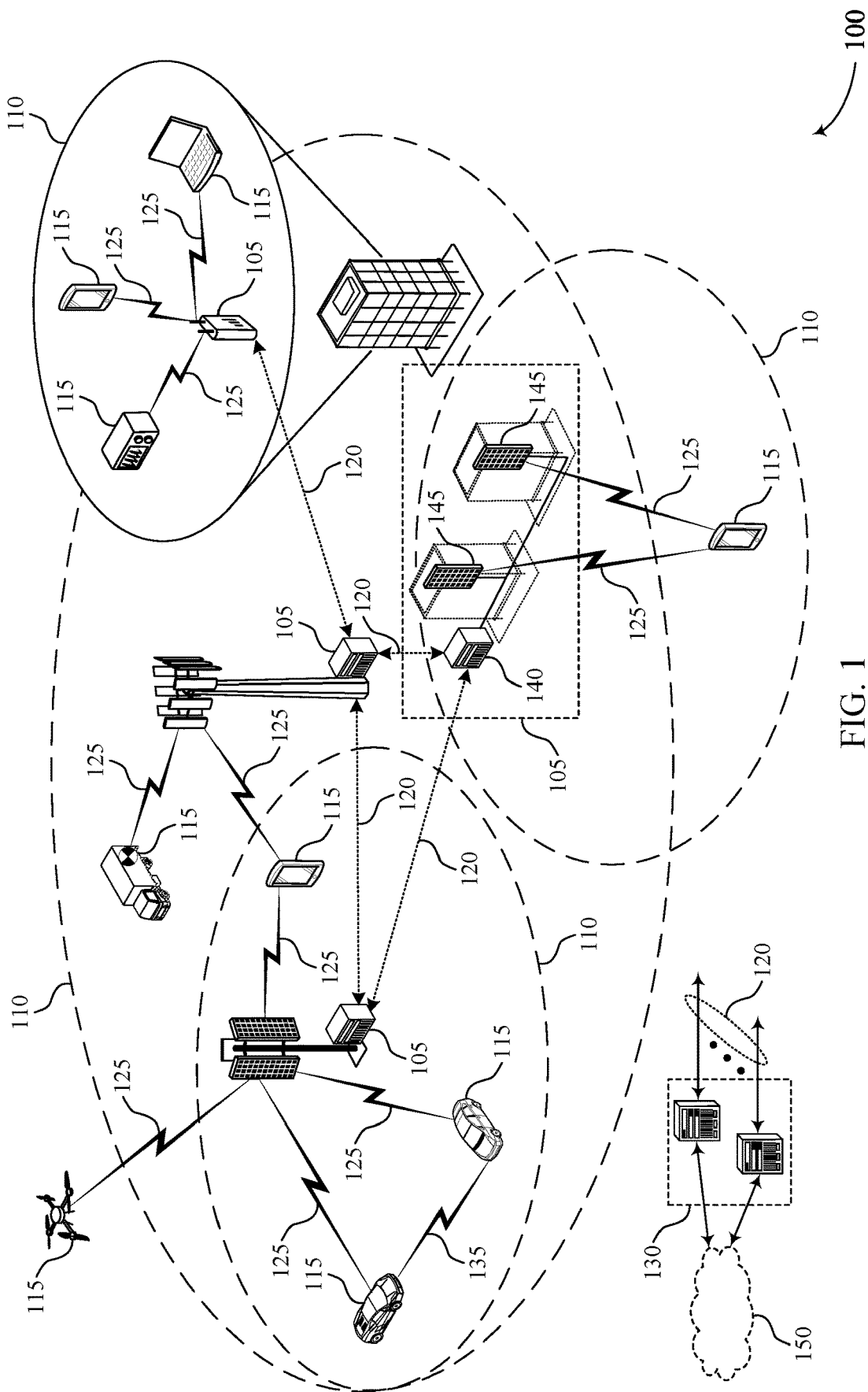
FIGS. 1 and 2 illustrate examples of wireless communications systems that supports control and data channel processing for higher bands in accordance with aspects of the present disclosure.

Some wireless communications systems may support signaling on high frequency bands or ultra-high frequency bands, which are associated with larger bandwidths relative to low frequency bands. In some examples, a high frequency band or a ultra-high frequency band may refer to bands above 100 GHz (e.g., up to sub THz bands). To communicate in a high frequency band, wireless devices such as user equipment (UE) and base stations may use different kinds of waveforms, for example, cyclic prefix-orthogonal frequency division multiplexing (CP-OFDM) waveforms or single carrier waveforms. In some cases, however, operations in higher frequency bands using different waveforms may be associated with increased phase noise, increased peak to average power ratio (PAPR), and increased subcarrier spacing, which shortens both symbols and slots used to carry signaled information. In such cases, the short symbol time also decreases the processing duration for a UE and increases decoding complexity because the UE may perform a larger number of fast Fourier transform (FFT) operations in order to accommodate the reduced symbol timing. For example, in some cases the shortened symbols and slots may reduce the time a UE has to decode downlink control information (DCI) such that the UE may be unable to decode the DCI before the start of a next slot. For example, in some cases, the UE may use multiple symbols to decode a DCI, or the processing time that the UE uses to decode the DCI may extend beyond a slot, which increases latency and reduces overall efficiency and reliability for shared channel transmissions scheduled by the DCI.

Wireless devices such as the UE may implement a number of different techniques to accommodate larger subcarrier spacing and shortened symbols of a single carrier waveform used in higher bands. For example, in some cases, control information (e.g., DCI) may be time multiplexed with data (e.g., physical downlink shared channel (PDSCH) data) in a single "block" or scheduled entity, and the UE may use a single discrete Fourier transform (DFT) processing to decode both the DCI and the shared channel information. Bundling the DCI and the PDSCH together in a single scheduled entity may allow the UE to receive data immediately following scheduling information, such that the UE remains scheduled to receive the shared channel information. In such cases, the UE may know to expect data directly after receiving a DCI, which may also reduce the number of blind decodes the UE performs to find DCI corresponding to a shared channel transmission.

In some implementations, the DCI and PDSCH may be multiplexed in a single symbol (e.g., intra-symbol multiplexed) or the DCI and the PDSCH may be multiplexed across multiple symbols (e.g., inter-symbol multiplexed), where each DFT window or block contains a DCI immediately followed by the PDSCH, followed by a guard interval. In some other cases, the UE may receive scheduling information included in the multiple DCIs, or more than one DCI may be contained within the DCI and PDSCH scheduled block. In some other cases, the DCI and PDSCH use the same transmission configuration indicator (TCI) state, or one or more demodulation reference signals (DMRSs) may be included in the block to facilitate accurate channel estimation.

Aspects of the disclosure are initially described in the context of wireless communications systems. Aspects of the disclosure are further illustrated by and described with reference to apparatus diagrams, system diagrams, control and data channel processing configurations, a process flow, and flowcharts that relate to control and data channel processing for higher bands.

FIG. 1 illustrates an example of a wireless communications system 100 that supports control and data channel processing for higher bands in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported DFT size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

To support communications in high frequency bands, UEs 115 and base stations 105 may employ a number of different waveforms such as CP-OFDM waveforms or single carrier waveforms. In some cases, however, high frequency communications may be associated with increased subcarrier spacing, which shortens both symbols and slots. For example, in some cases, the shortened symbols and slots may reduce the time a UE 115 has to decode control information such as DCI, and the processing time that the UE 115 uses to decode the DCI may extend beyond a slot, which increases signaling latency and reduces reliability of the shared channel scheduled by the DCI.

To accommodate larger subcarrier spacing and shortened symbols of a single carrier waveform used in higher bands, control channel information may be time multiplexed with data channel information in a single "block" or scheduled entity, and the UE 115 may use a single DFT processing duration to decode both the DCI and the shared channel information. In such cases, the DCI and the PDSCH being bundled together in a single scheduled entity may allow the UE 115 to receive data immediately following scheduling information.

Figure 2:
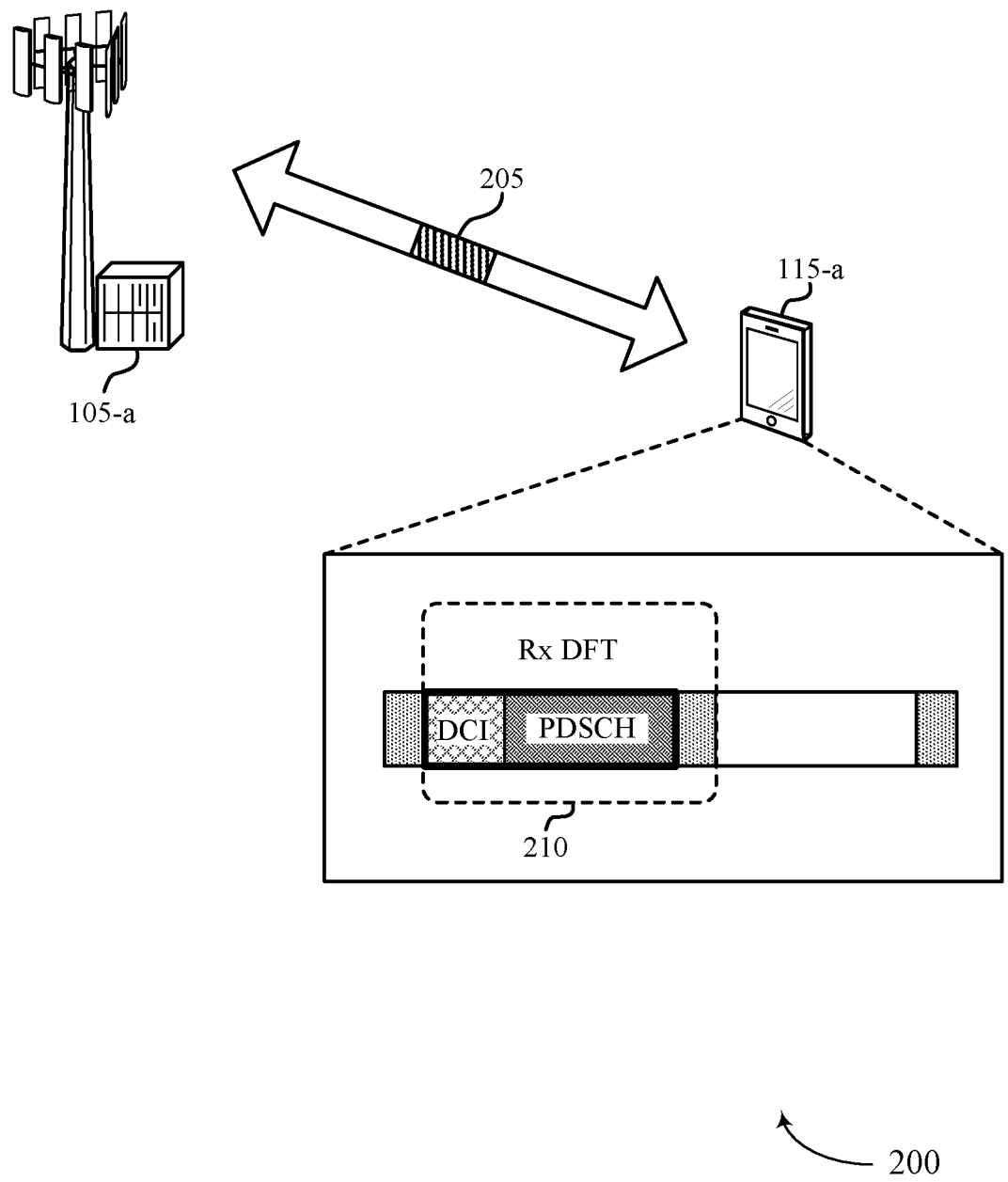

FIG. 2 illustrates an example of a wireless communications system 200 that supports control and data channel processing for higher bands in accordance with aspects of the present disclosure. The wireless communications system 200 may implement or be implemented by one or more aspects of the wireless communications system 100. For example, the wireless communications system 200 may include a UE 115-a and a base station 105-a, which may be examples of corresponding UEs 115 and base stations 105 as described with reference to FIG. 1.

Some wireless communications systems (such as 5G/new radio (NR) systems) may support signaling on higher frequency bands (e.g., bands above 100 GHz) using larger bandwidths relative to lower frequency bands. To support both downlink and uplink communications on such higher frequency bands, devices such as the UE 115-a and the base station 105-a may communicate using different kinds of waveforms, for example, CP-OFDM waveforms, single carrier waveforms, or a combination thereof.

In some examples, CP-OFDM waveforms may be cyclic prefix based, and may have increased subcarrier spacing relative to other waveforms. Additionally or alternatively, CP-OFDM waveforms may implement higher order MIMO operations and single tap frequency domain equalization (FDE) and may be associated with efficient bandwidth utilization. In some cases, however, CP-OFDM waveforms may have higher complexity relative to single carrier implementations.

In contrast, single carrier waveforms may include frequency domain (FD) implementations (e.g., DFT-s-OFDM) or time domain (TD) implementations (e.g., SC-QAM). For FD implementations, the single carrier waveform may include a cyclic prefix or guard interval, and may implement single tap FDE. The single carrier FD waveform may use FDM for efficient bandwidth utilization, but may be higher complexity relative to TD single carrier implementations. TD single carrier waveforms may also include a cyclic prefix or guard interval or guard band, and may implement single tap FDE or time domain equalization (TDE). The TD single carrier waveform may use time domain filtering to lower PAPR relative to FD waveforms with lower signal to noise ratio (SNR) and lower complexity.

In some cases, however, operations in higher bands using different waveforms may be associated with increased phase noise, PAPR, and increased subcarrier spacing, which shortens both symbols and slots used to signal information between devices. In such cases, the short symbol time (e.g., 1 per subcarrier spacing) increases decoding complexity because devices such as the UE 115-a may perform a larger number of FFT operations (e.g., relative to implementations having larger subcarrier spacing and longer symbol timings) to decode information. For example, the shortened symbols and slots may reduce the time the UE 115-*a* has to decode DCI, and in some cases, the UE 115-*a* may be unable to decode the DCI before the start of a next slot. For example, in some cases, the UE may use multiple symbols to decode a DCI, or the processing time may extend beyond a slot.

In such cases, the search space set periodicity may be sparse (e.g., the periodicity may be greater than one per slot) since the UE 115-*a* may not have adequate time to decode the DCI before the start of each slot. In some other examples, shorter symbols may increase sample buffering and physical downlink control channel (PDCCH) blind decoding, which may increase the power and memory consumption of the UE 115-*a*. For example, the UE 115-*a* may buffer samples starting from the DCI reception until DCI is decoded to account for cases in which the PDSCH was present before the UE 115-*a* decodes DCI (e.g., time domain resource assignment (TDRA) value <UE DCI decode time).

To accommodate larger subcarrier spacing and shortened slots and symbols of a single carrier waveform used in higher bands, the wireless communications system 200 may implement a number of different techniques. For example, in some cases, control information (e.g., DCI) may be time multiplexed with data (e.g., PDSCH) in a single "block" or scheduled entity 210 associated with a single receiving (Rx) DFT processing period for the UE 115-*a*. A single RX DFT processing period may be an example of a single discrete transform process. Bundling the DCI and the PDSCH together in a single scheduled entity allows the UE 115-*a* to receive data immediately following scheduling information, which reduces the number of blind decodes the UE 115-*a* may perform to find DCI. In such cases, the UE 115-*a* may monitor search space sets less frequently (e.g., sparse search sets), and the UE 115-*a* may expect data whenever it receives a DCI.

The UE 115-*a* may receive an indication 205 of the DCI and PDSCH scheduled block 210 from the base station 105-*a*, and the UE 115-*a* may determine that it is to receive data immediately after receiving a DCI in a single DFT processing period. This also allows the UE 115-*a* to use a single channel estimation to decode the block 210, and a single cyclic prefix or guard interval could be associated with the block to decrease complexity. For example, the UE 115-*a* may use a single channel estimation, a single cyclic prefix, a single guard interval, or some combination when decoding both the DCI and the PDSCH in the block 210.

In some implementations, the DCI and PDSCH may be intra-symbol multiplexed or inter-symbol multiplexed, where each DFT window or block 210 contains a DCI immediately followed by the PDSCH, followed by a guard interval. In some other cases, the UE 115-*a* may receive scheduling information included in the multiple DCIs, or more than one DCI may be contained within the DCI and PDSCH scheduled block 210. In some other cases, the DCI and PDSCH use the same TCI state, or one or more DMRSs may be included in the block to facilitate accurate channel estimation.

Figure 3:
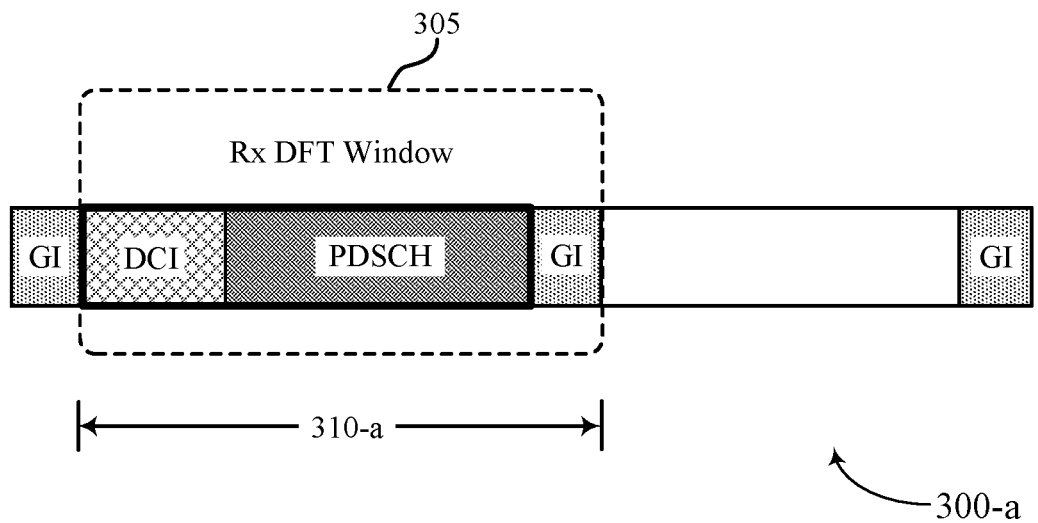
FIGS. 3 and 4 illustrate examples of control and data channel processing configurations that support control and data channel processing for higher bands in accordance with aspects of the present disclosure.
Figure 3:
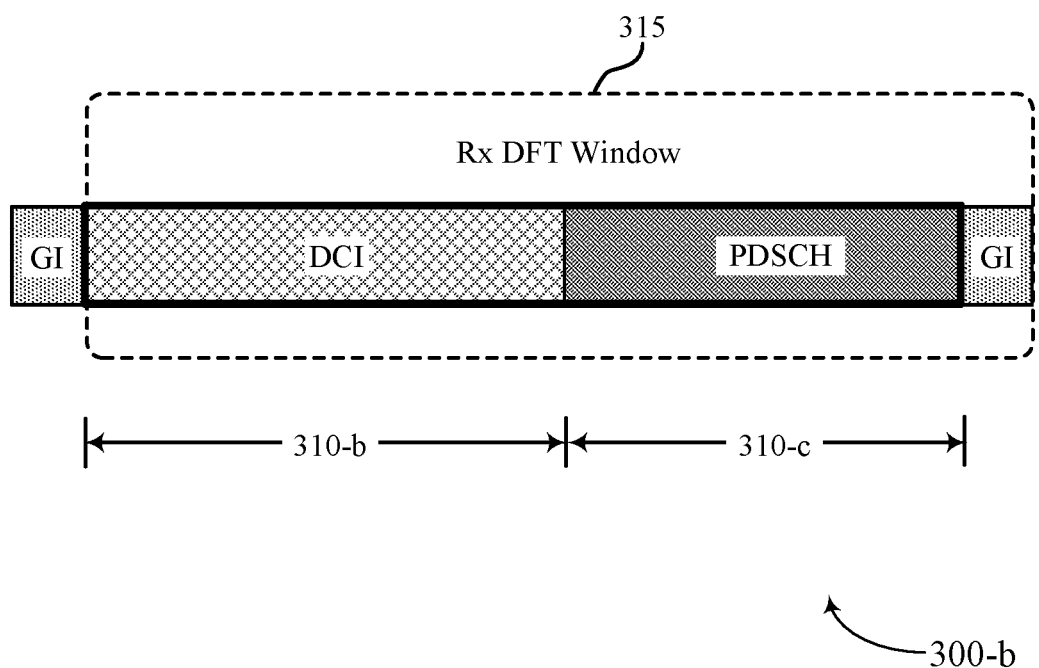

FIG. 3 illustrates an example of control and data channel processing configurations 300-*a* and 300-*b* that support control and data channel processing for higher bands in accordance with aspects of the present disclosure. For example, the control and data channel processing configurations 300-*a* and 300-*b* may implement or be implemented by one or more aspects of the wireless communications systems 100 and 200. For example, control and data channel processing configurations 300-*a* and 300-*b* may be signaled by a base station and received by a UE.

To support operations in high frequency bands using single carrier waveforms (e.g., bands at or above 100 GHz), a control channel (e.g., PDCCH) including scheduling information (e.g., DCI) may time multiplexed with a data channel (e.g., PDSCH) in a single block or scheduled entity. In such cases, the data channel is followed by the DCI in the block such that a UE decoding the DCI knows the TDRA for the PDSCH upon receiving the DCI. In some examples, the scheduling of the DCI and PDSCH block may reduce latency and increase secluding efficiency because the UE may buffer one symbol between receiving the DCI and the associated PDSCH.

In some cases, the receiving UE may use a single discrete transform process such as a DFT processing or the like to decode both the DCI and the PDSCH within the scheduled block (e.g., instead of separate DFT processes for both DCI and PDSCH), although the UE may in some cases use multiple DFTs. Additionally or alternatively, the UE may implement a single channel estimation for both the control channel (e.g., PDCCH carrying the DCI) and for the data channel (e.g., PDSCH). Further, a single cyclic prefix (CP) or GI may be included in the DCI and PDSCH block, such that both the control channel and the data channel share one CP or GI.

A wireless communications system may support different multiplexing configurations for the DCI and PDSCH block. For example, in 300-*a*, the DCI and PDSCH processing block 305 may be intra-symbol multiplexed to include a DCI, a PDSCH, and a single GI included in a single symbol 310-*a*. The UE may receive the DCI and PDSCH processing block 305 may perform a single DFT process within the Rx DFT window across the single slot 310-*a* to decode both the DCI and the PDSCH.

In 300-*a*, the DCI and PDSCH processing block 315 may be inter-symbol multiplexed to include a DCI, a PDSCH, and a single GI included in back-to-back symbols 310-*b* and 310-*c*. The UE may receive the DCI and PDSCH processing block 315 may perform a single DFT process within the Rx DFT window across both slots 310-*b* and 310-*c* to decode both the DCI and the PDSCH. In such cases of inter-symbol multiplexing, the different power levels and control may be used per symbol.

Figure 4:
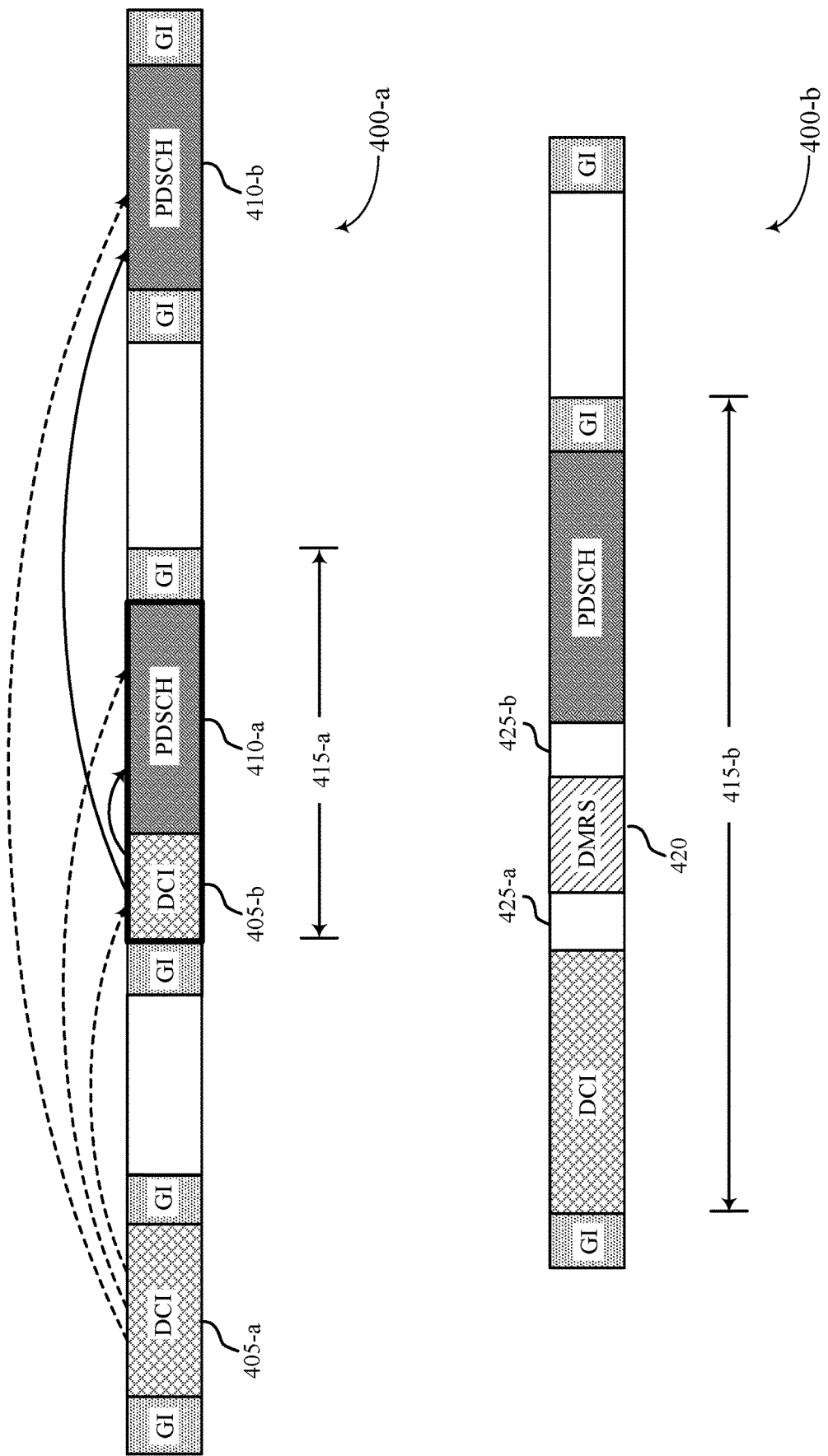

FIG. 4 illustrates an example of control and data channel processing configurations 400-*a* and 400-*b* that support control and data channel processing for higher bands in accordance with aspects of the present disclosure. For example, the control and data channel processing configurations 400-*a* and 400-*b* may implement or be implemented by one or more aspects of the wireless communications systems 100 and 200. For example, control and data channel processing configurations 400-*a* and 400-*b* may be signaled by a base station and received by a UE.

In control and data channel processing configurations 400-*a* and 400-*b*, a control channel (e.g., PDCCH) including scheduling information (e.g., DCI 405) may time multiplexed with a data channel (e.g., PDSCH 410) in a single block or scheduled entity 415. In such cases, the data channel is followed by the DCI in the block such that a UE decoding the DCI knows the TDRA for the PDSCH upon receiving the DCI.

In some examples, multiple DCI may schedule one or more PDSCHs. For example, in control and data channel processing configuration 400-*a*, the DCI 405-*b* carried by the block 415-*a* may include information for the PDSCH 410-a (in the same block). Additionally or alternatively, the DCI 405-b may include information for other upcoming PDSCHs, PUSCHs, reference signals, or any other scheduled channel.

Further, the information in DCI 405-b may be supplemented by additional information included in a previous DCI such as DCI 405-a.

In some examples, the DCI 405-b may be "self-sufficient" or standalone such that the DCI 405-a includes all of the information for scheduling PDSCH 410-a. In some other examples the DCI 405-b may include a smaller number of parameters (e.g., relative to a self-sufficient DCI) and supplements another prior DCI such as DCI 405-a. In such examples, the DCI 405-b may be the second DCI in a 2-stage DCI procedure. For example, in some cases the first DCI 405-a may include TDRA information and TCI state information for the PDSCH 410-a or 410-b, and the second DCI 405-b may include modulation and coding scheme (MCS) information for the PDSCH 410-a or 410-b, although other parameters are possible.

In some examples, the DCI and PDSCH block may include one or more DMRSs for accurate channel estimation. For example, in control and data channel processing configuration 400-b, one or more DMRSs 420 may be multiplexed in the DCI and PDSCH block 415-b. To facilitate channel estimation for multiple symbols, gaps (e.g., gaps 425-a and 425-b) may be inserted between the DMRS, the DCI and the PDSCH.

In either control and data channel processing configuration 400-a or 400-b, the PDCCH carrying the DCI and the PDSCH in the same scheduled block may use the same TCI state (e.g., the UE may receive the DCI and the PDSCH using the same beam). For example, since the DCI and the PDSCH are received one after the other, the UE may not have time to switch beams between receptions and thus may receive both using the same beam. Additionally or alternatively, in some examples, one or more DCIs may include scheduling information for one or more UEs. The one or more DCIs may be located in the single scheduled block 415 to support multi-UE scheduling.

Figure 5:
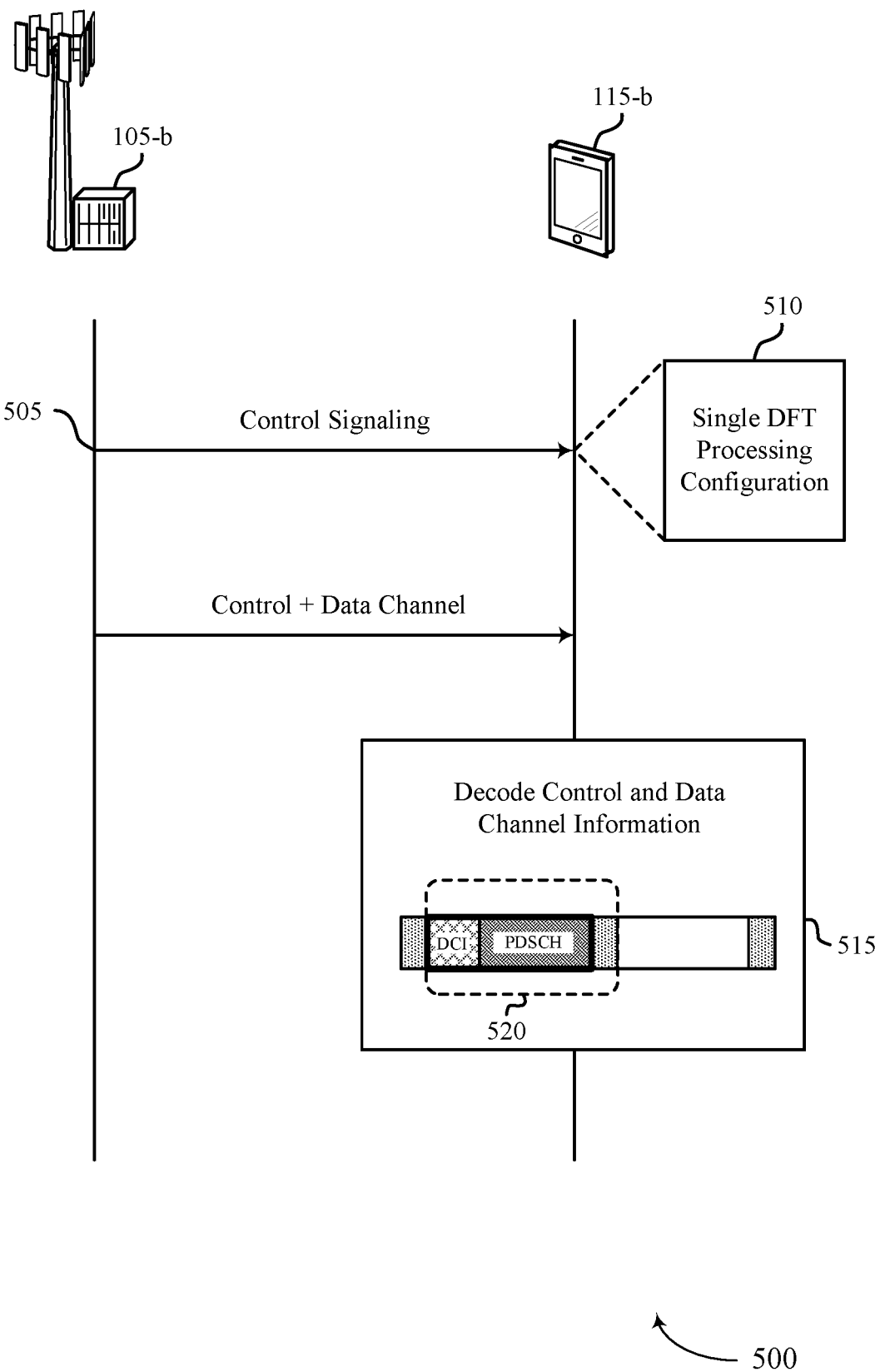
FIG. 5 illustrates an example of a process flow that supports control and data channel processing for higher bands in accordance with aspects of the present disclosure.

FIG. 5 illustrates an example of a process flow 500 that supports control and data channel processing for higher bands in accordance with aspects of the present disclosure. The process flow 500 may implement aspects of wireless communications systems 100 and 200, or may be implemented by aspects of the wireless communications system 100 and 200. For example, the process flow 500 may illustrate operations between a UE 115-b and a base station 105-b, which may be examples of corresponding devices described with reference to FIGS. 1 and 2. In the following description of the process flow 500, the operations between the UE 115-b and the base station 105-b may be transmitted in a different order than the example order shown, or the operations performed by the UE 115-b and the base station 105-b may be performed in different orders or at different times or by different devices. Additionally or alternatively, some operations may also be omitted from the process flow 500, and other operations may be added to the process flow 500. In addition, while process flow 500 illustrates operations between a UE and a base station, the described processes may be implemented at different wireless devices.

At 505, the base station 105-b may transmit, and the UE 115-b may receive, control signaling indicating a configuration 510 for decoding control channel information at the UE 115-b using a single discrete transform process. In some examples, the configuration is for decoding control channel information (e.g., DCI) that is time multiplexed with data channel information (e.g., PDSCH) in one or more symbols of a single carrier waveform.

At 515, the UE 115-b may decode the control channel information and the data channel information using the single discrete transform process in accordance with the configuration. For example, in some cases, the UE 115-b may perform a single channel estimation procedure 520 (e.g., a single DFT processing duration) for the control channel information and the data channel information over the one or more symbols of the single carrier waveform. The single discrete transform process 520 may in some cases include a single guard interval or a single cyclic prefix associated with the control channel information and the data channel information in the one or more symbols.

In some cases, the UE 115-b may decode the control channel information and the data channel information in adjacent symbols using the single discrete transform process 520 and in accordance with the configuration. In such cases, the control channel information may be included in a first symbol and the data channel information may be included in a second symbol. Further, based on the control channel information and the data channel information being contained in different symbols, the UE 115-b may operate using a first power level during the first symbol and a second power level (different from the first power level) during the second symbol based on the configuration. In some examples, the single discrete transform process 520 may be associated with a scheduling block in which the control channel information is contiguous with the data channel information and a guard period within the scheduling block.

In some other examples, the control channel information corresponds to the data channel information and further corresponds to information associated with at least one additional data channel. The UE 115-b may decode the control channel information, the data channel information, and information associated with at least one future data channel in accordance with the configuration. In such examples, the control channel information may be associated with the data channel information and the at least one future scheduled data channel. In some other examples, the UE 115-b may decode the control channel information, the data channel information, and the information associated with the at least one additional data channel based on the control channel information and additional control channel information received in a prior symbol.

In some cases, the UE 115-b may use a single TCI state or beam to receive both the control channel information and the shared channel information.

To facilitate channel estimation for receiving the control channel information and the shared channel information, in some cases the single discrete transform process 520 includes one or more DMRSs that are multiplexed with the control channel information and the data channel information. In some cases, the single discrete transform process 520 may further include one or more symbol gaps between respective DMRSs. The UE 115-b may perform channel estimation for the control channel information and the data channel information in the one or more DMRSs during the single discrete transform process 520.

In some other examples, the single discrete transform process 520 may include one or more DCIs for scheduling the UE 115-b and at least one other UE.

Figure 6:
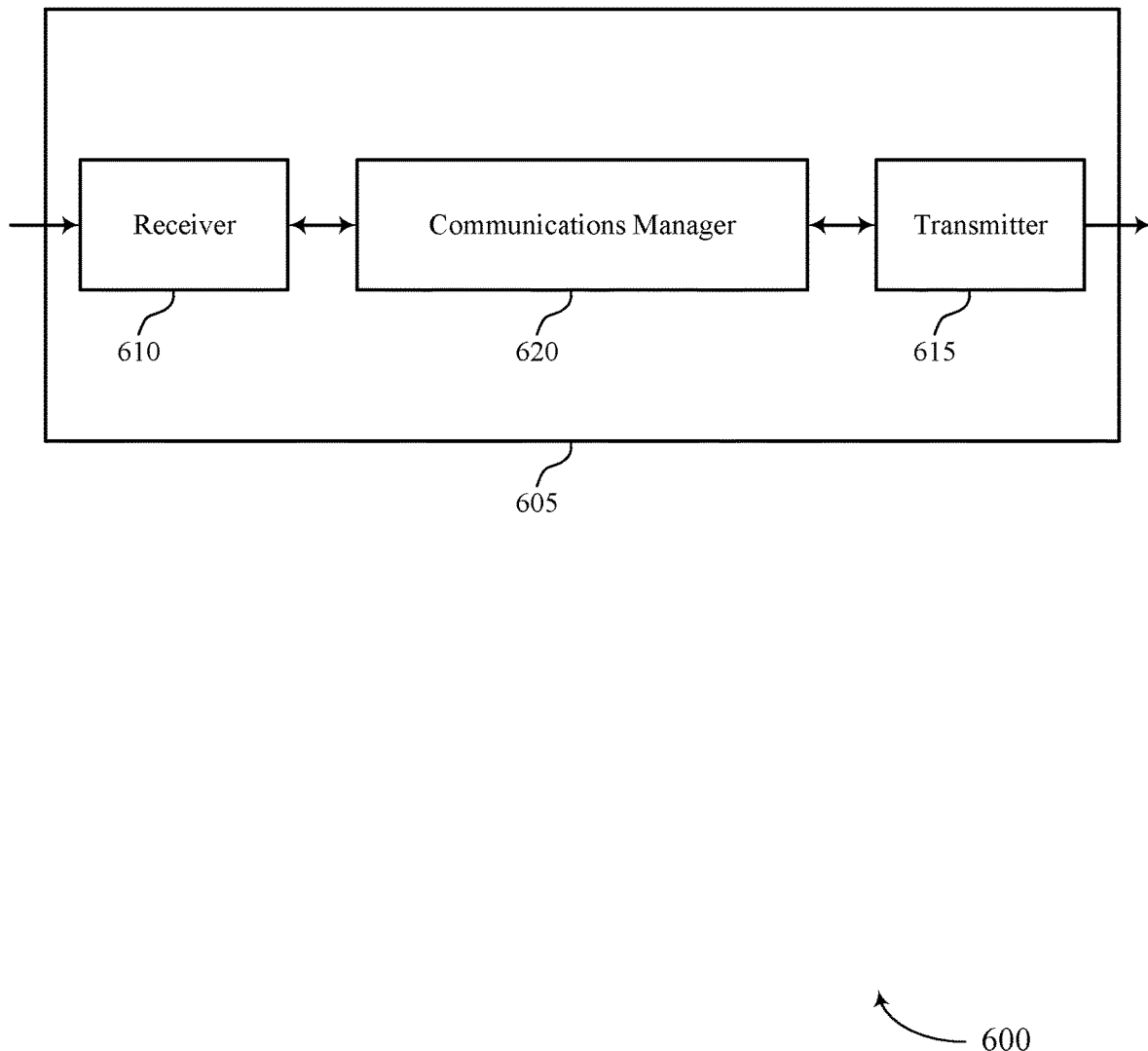
FIGS. 6 and 7 show block diagrams of devices that support control and data channel processing for higher bands in accordance with aspects of the present disclosure.

FIG. 6 shows a block diagram 600 of a device 605 that supports control and data channel processing for higher bands in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to control and data channel processing for higher bands). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to control and data channel processing for higher bands). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of control and data channel processing for higher bands as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. For example, the communications manager 620 may be configured as or otherwise support a means for receiving control signaling indicating a configuration for decoding control channel information at the UE using a single discrete transform process, where the configuration is for decoding control channel information that is time multiplexed with data channel information in one or more symbols of a single carrier waveform. The communications manager 620 may be configured as or otherwise support a means for decoding the control channel information and the data channel information using the single discrete transform process in accordance with the configuration.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reduced processing, reduced power consumption, more efficient utilization of communication resources, reduced blind decoding processes, and increased scheduling efficiency.

Figure 7:
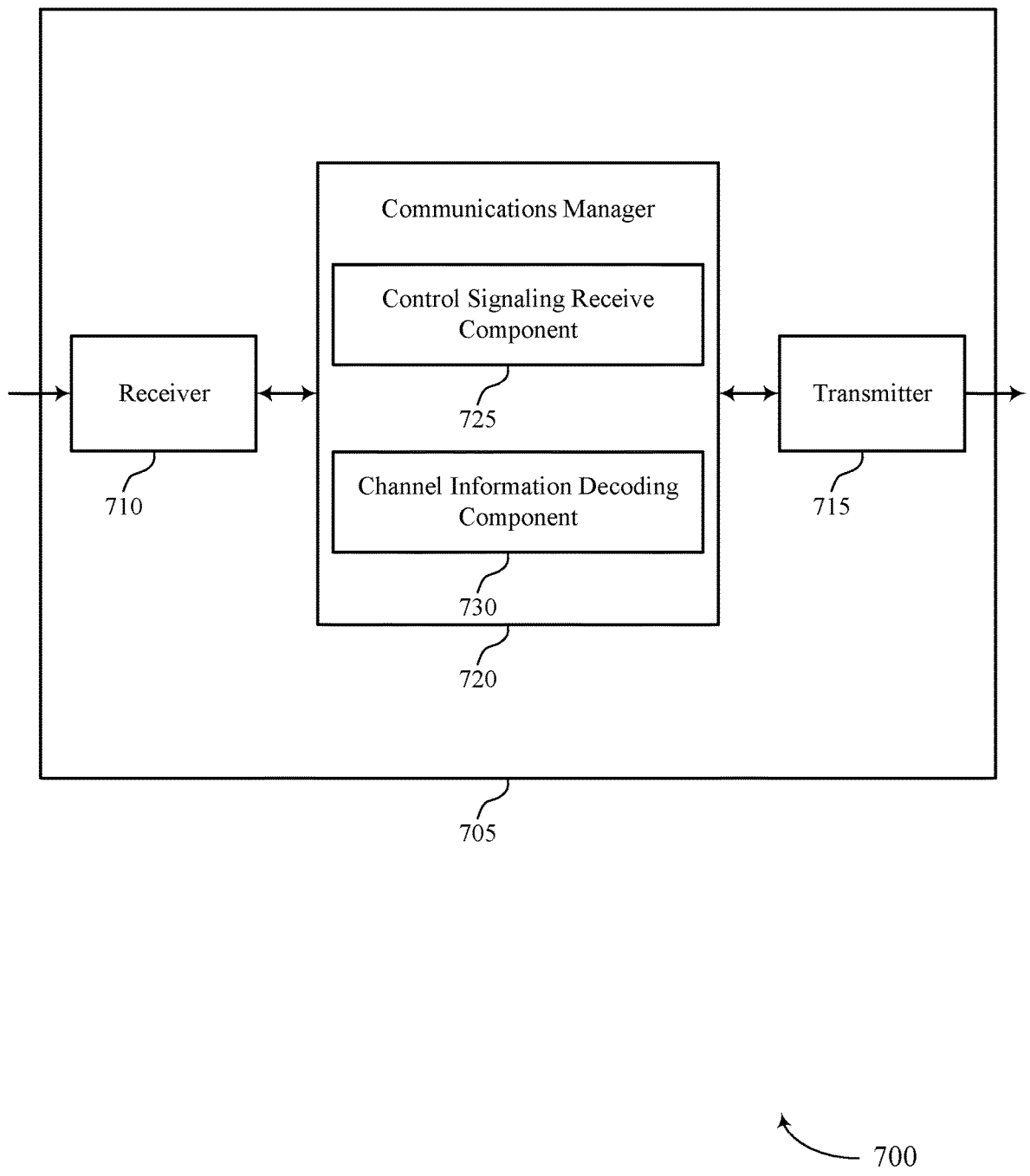

FIG. 7 shows a block diagram 700 of a device 705 that supports control and data channel processing for higher bands in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to control and data channel processing for higher bands). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to control and data channel processing for higher bands). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of control and data channel processing for higher bands as described herein. For example, the communications manager 720 may include a control signaling receive component 725 a channel information decoding component 730, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. The control signaling receive component 725 may be configured as or otherwise support a means for receiving control signaling indicating a configuration for decoding control channel information at the UE using a single discrete transform process, where the configuration is for decoding control channel information that is time multiplexed with data channel information in one or more symbols of a single carrier waveform. The channel information decoding component 730 may be configured as or otherwise support a means for decoding the control channel information and the data channel information using the single discrete transform process in accordance with the configuration.

Figure 8:
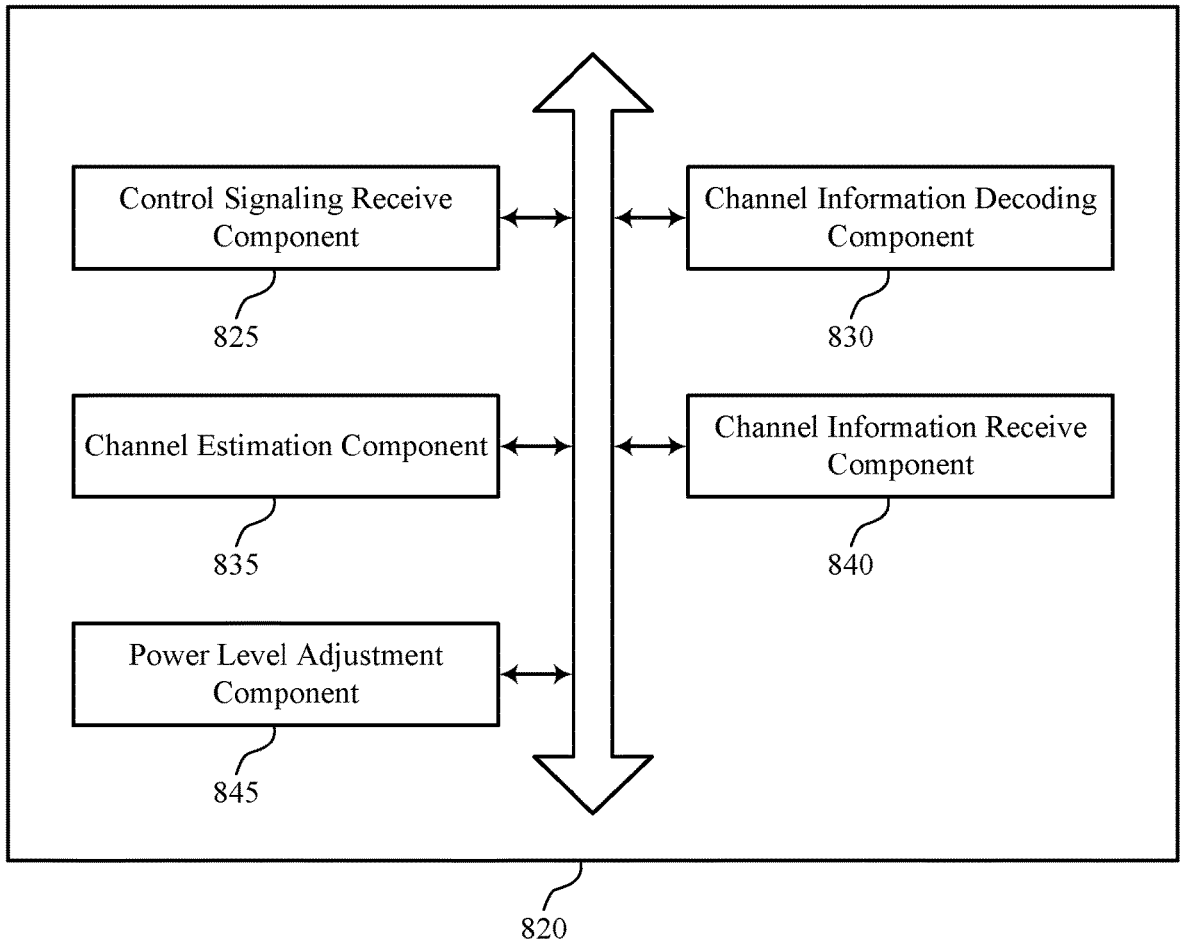
FIG. 8 shows a block diagram of a communications manager that supports control and data channel processing for higher bands in accordance with aspects of the present disclosure.

FIG. 8 shows a block diagram 800 of a communications manager 820 that supports control and data channel processing for higher bands in accordance with aspects of the present disclosure. The communications manager 820 may be an example of aspects of a communications manager 620, a communications manager 720, or both, as described herein. The communications manager 820, or various components thereof, may be an example of means for performing various aspects of control and data channel processing for higher bands as described herein. For example, the communications manager 820 may include a control signaling receive component 825, a channel information decoding component 830, a channel estimation component 835, a channel information receive component 840, a power level adjustment component 845, or any combination thereof. Each of these components may communicate, directly or indirectly, with one another (e.g., via one or more buses).

The communications manager 820 may support wireless communications at a UE in accordance with examples as disclosed herein. The control signaling receive component 825 may be configured as or otherwise support a means for receiving control signaling indicating a configuration for decoding control channel information at the UE using a single discrete transform process, where the configuration is for decoding control channel information that is time multiplexed with data channel information in one or more symbols of a single carrier waveform. The channel information decoding component 830 may be configured as or otherwise support a means for decoding the control channel information and the data channel information using the single discrete transform process in accordance with the configuration.

In some examples, to support decoding the control channel information and the data channel information using the single discrete transform process, the channel estimation component 835 may be configured as or otherwise support a means for performing a single channel estimation procedure for the control channel information and the data channel information over the one or more symbols based on the configuration.

In some examples, the single discrete transform process includes a single guard interval associated with the control channel information and the data channel information in the one or more symbols.

In some examples, the single discrete transform process includes a single cyclic prefix associated with the control channel information and the data channel information in the one or more symbols.

In some examples, the channel information decoding component 830 may be configured as or otherwise support a means for decoding the control channel information and the data channel information in a single symbol using the single discrete transform process in accordance with the configuration.

In some examples, the channel information decoding component 830 may be configured as or otherwise support a means for decoding the control channel information and the data channel information in adjacent symbols using the single discrete transform process and in accordance with the configuration, where the control channel information is included in a first symbol and the data channel information is included in a second symbol.

In some examples, the power level adjustment component 845 may be configured as or otherwise support a means for operating using a first power level during the first symbol and a second power level during the second symbol based on the configuration, where the first power level is different from the second power level.

In some examples, the single discrete transform process is associated with a scheduling block in which the control channel information is contiguous with the data channel information and a guard period within the scheduling block.

In some examples, the control channel information corresponds to the data channel information and further corresponds to information associated with at least one additional data channel, and the channel information decoding component 830 may be configured as or otherwise support a means for decoding the control channel information, the data channel information, and information associated with at least one future data channel in accordance with the configuration, where the control channel information is associated with the data channel information and the at least one future data channel.

In some examples, the channel information decoding component 830 may be configured as or otherwise support a means for decoding the control channel information, the data channel information, and the information associated with the at least one additional data channel based on the control channel information and additional control channel information received in a prior symbol.

In some examples, the channel information receive component 840 may be configured as or otherwise support a means for receiving the control channel information and the data channel information in accordance with a single transmission configuration indicator state.

In some examples, the single discrete transform process includes one or more DMRSs that are multiplexed with the control channel information and the data channel information, and the channel estimation component 835 may be configured as or otherwise support a means for performing channel estimation for the control channel information and the data channel information in the one or more DMRSs during the single discrete transform process.

In some examples, one or more symbol gaps are included between symbols of the one or more DMRSs, the control channel information, and the data channel information.

In some examples, the control channel information includes a single DCI associated with the UE or multiple DCI associated with at least the UE and one or more additional UEs.

In some examples, the control channel information and the data channel information are multiplexed on the single carrier waveform.

In some examples, the single discrete transform process includes a DFT processing duration.

Figure 9:
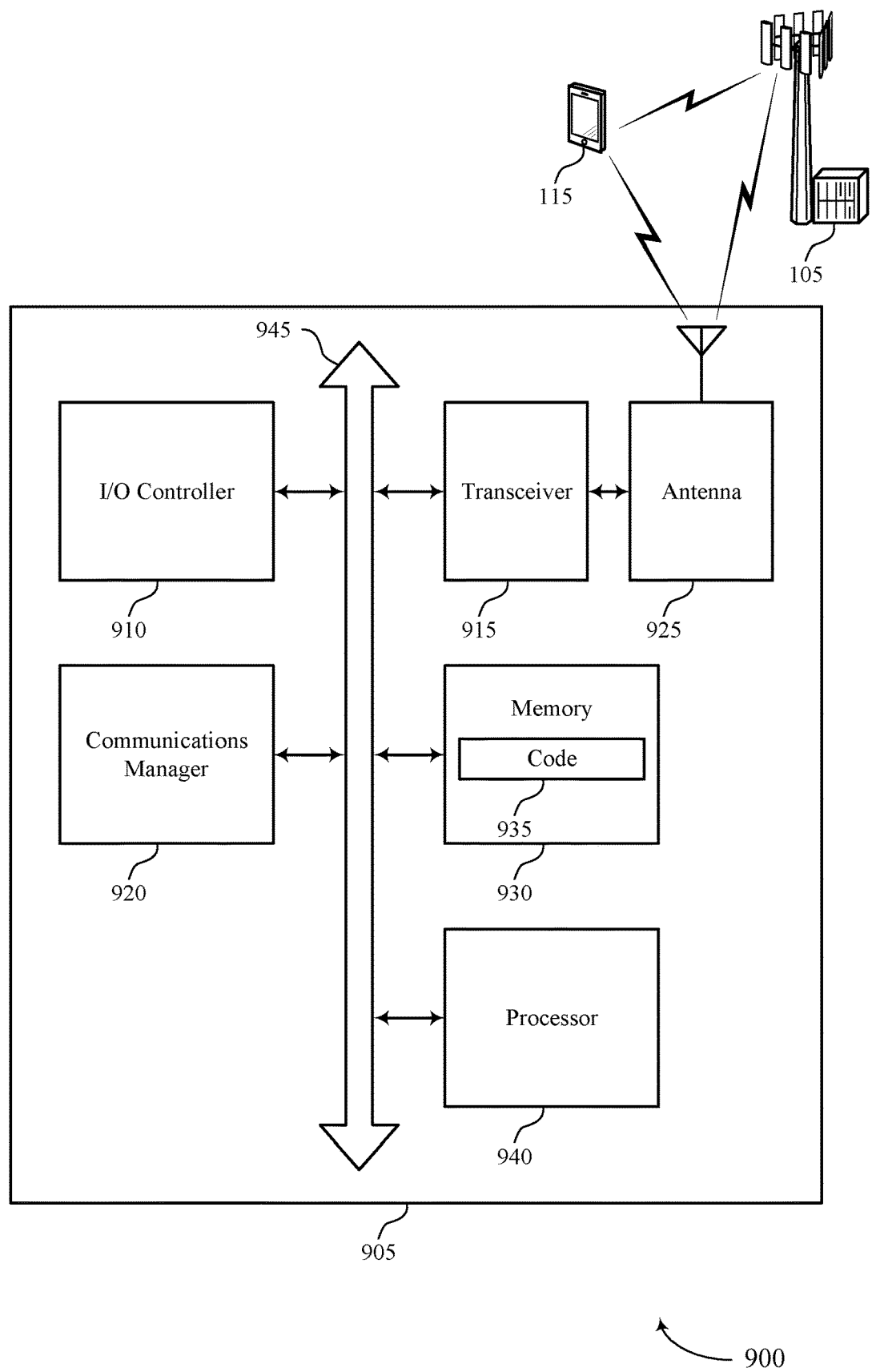
FIG. 9 shows a diagram of a system including a device that supports control and data channel processing for higher bands in accordance with aspects of the present disclosure.

FIG. 9 shows a diagram of a system 900 including a device 905 that supports control and data channel processing for higher bands in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting control and data channel processing for higher bands). For example, the device 905 or a component of the device 905 may include a processor 940 and memory 930 coupled to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for receiving control signaling indicating a configuration for decoding control channel information at the UE using a single discrete transform process, where the configuration is for decoding control channel information that is time multiplexed with data channel information in one or more symbols of a single carrier waveform. The communications manager 920 may be configured as or otherwise support a means for decoding the control channel information and the data channel information using the single discrete transform process in accordance with the configuration.

By including or configuring the communications manager 920 in accordance with examples as described herein, the device 905 may support techniques for improved communication reliability, reduced latency, improved user experience related to reduced processing, reduced power consumption, more efficient utilization of communication resources, improved coordination between devices, longer battery life due to reduced processing and blind decoding, and improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of control and data channel processing for higher bands as described herein, or the processor 940 and the memory 930 may be otherwise configured to perform or support such operations.

Figure 10:
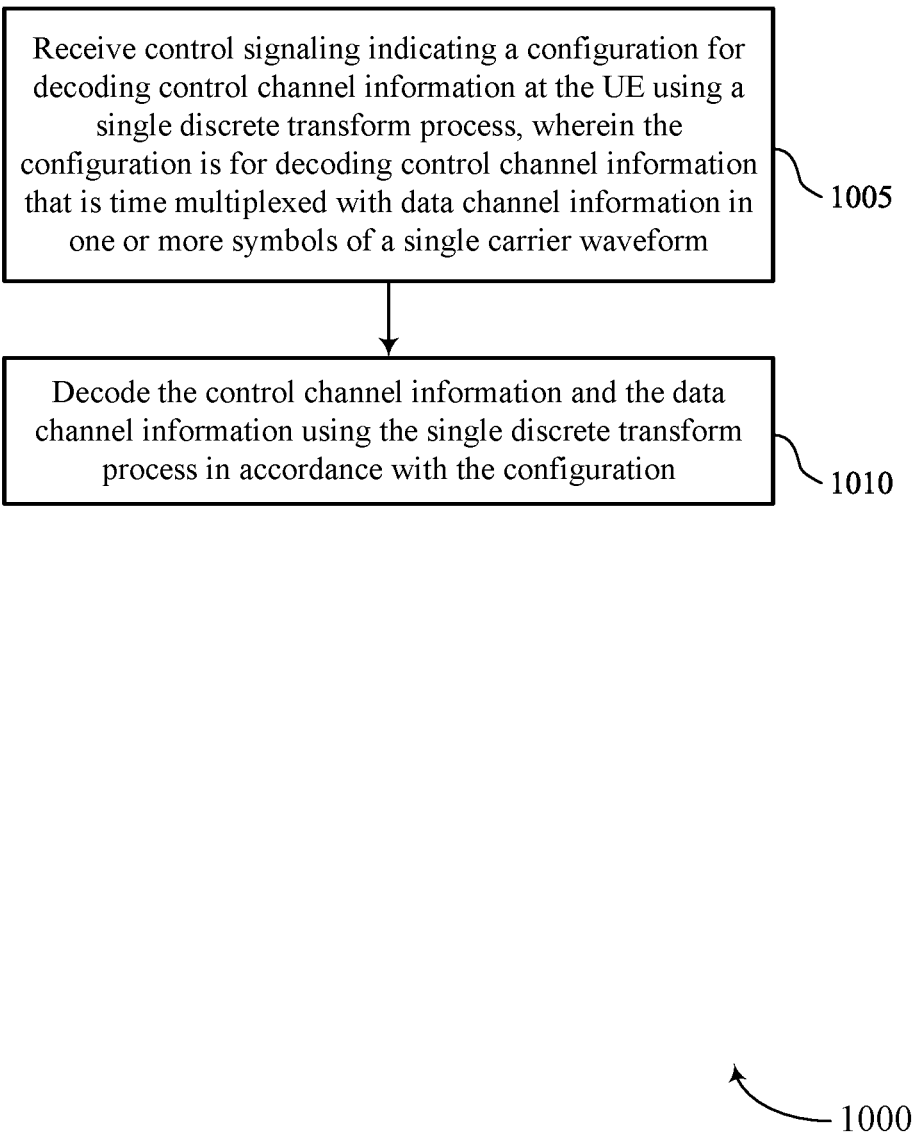
FIGS. 10 through 15 show flowcharts illustrating methods that support control and data channel processing for higher bands in accordance with aspects of the present disclosure.

FIG. 10 shows a flowchart illustrating a method 1000 that supports control and data channel processing for higher bands in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1005, the method may include receiving control signaling indicating a configuration for decoding control channel information at the UE using a single discrete transform process, where the configuration is for decoding control channel information that is time multiplexed with data channel information in one or more symbols of a single carrier waveform. The operations of 1005 may be performed in accordance with examples as disclosed herein. In some examples, aspects of the operations of 1005 may be performed by a control signaling receive component 825 as described with reference to FIG. 8.

At 1010, the method may include decoding the control channel information and the data channel information using the single discrete transform process in accordance with the configuration. The operations of 1010 may be performed in accordance with examples as disclosed herein. In some examples, aspects of the operations of 1010 may be performed by a channel information decoding component 830 as described with reference to FIG. 8.

Figure 11:
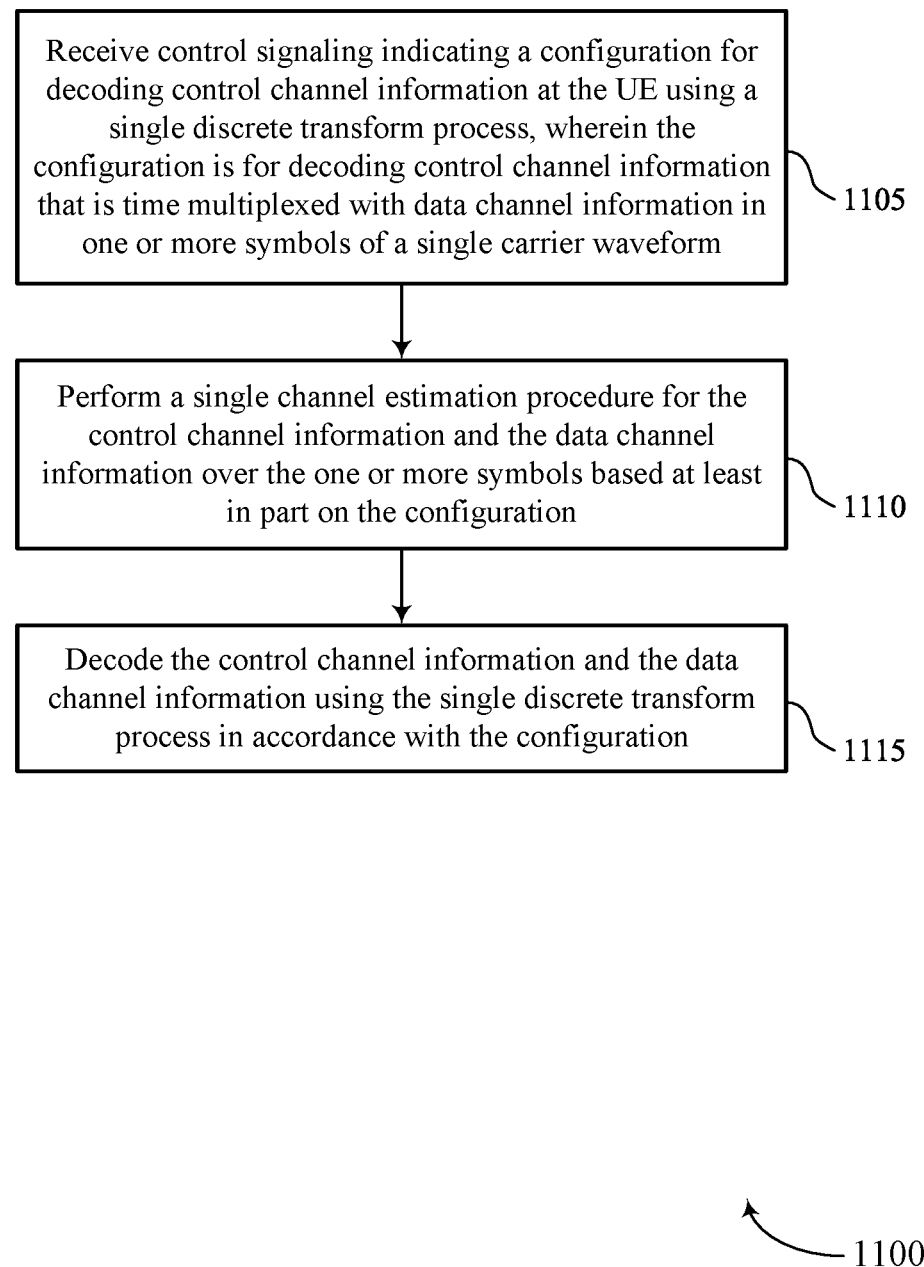

FIG. 11 shows a flowchart illustrating a method 1100 that supports control and data channel processing for higher bands in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1105, the method may include receiving control signaling indicating a configuration for decoding control channel information at the UE using a single discrete transform process, where the configuration is for decoding control channel information that is time multiplexed with data channel information in one or more symbols of a single carrier waveform. The operations of 1105 may be performed in accordance with examples as disclosed herein. In some examples, aspects of the operations of 1105 may be performed by a control signaling receive component 825 as described with reference to FIG. 8.

At 1110, the method may include performing a single channel estimation procedure for the control channel information and the data channel information over the one or more symbols based on the configuration. The operations of 1110 may be performed in accordance with examples as disclosed herein. In some examples, aspects of the operations of 1110 may be performed by a channel estimation component 835 as described with reference to FIG. 8.

At 1115, the method may include decoding the control channel information and the data channel information using the single discrete transform process in accordance with the configuration. The operations of 1115 may be performed in accordance with examples as disclosed herein. In some examples, aspects of the operations of 1115 may be performed by a channel information decoding component 830 as described with reference to FIG. 8.

Figure 12:
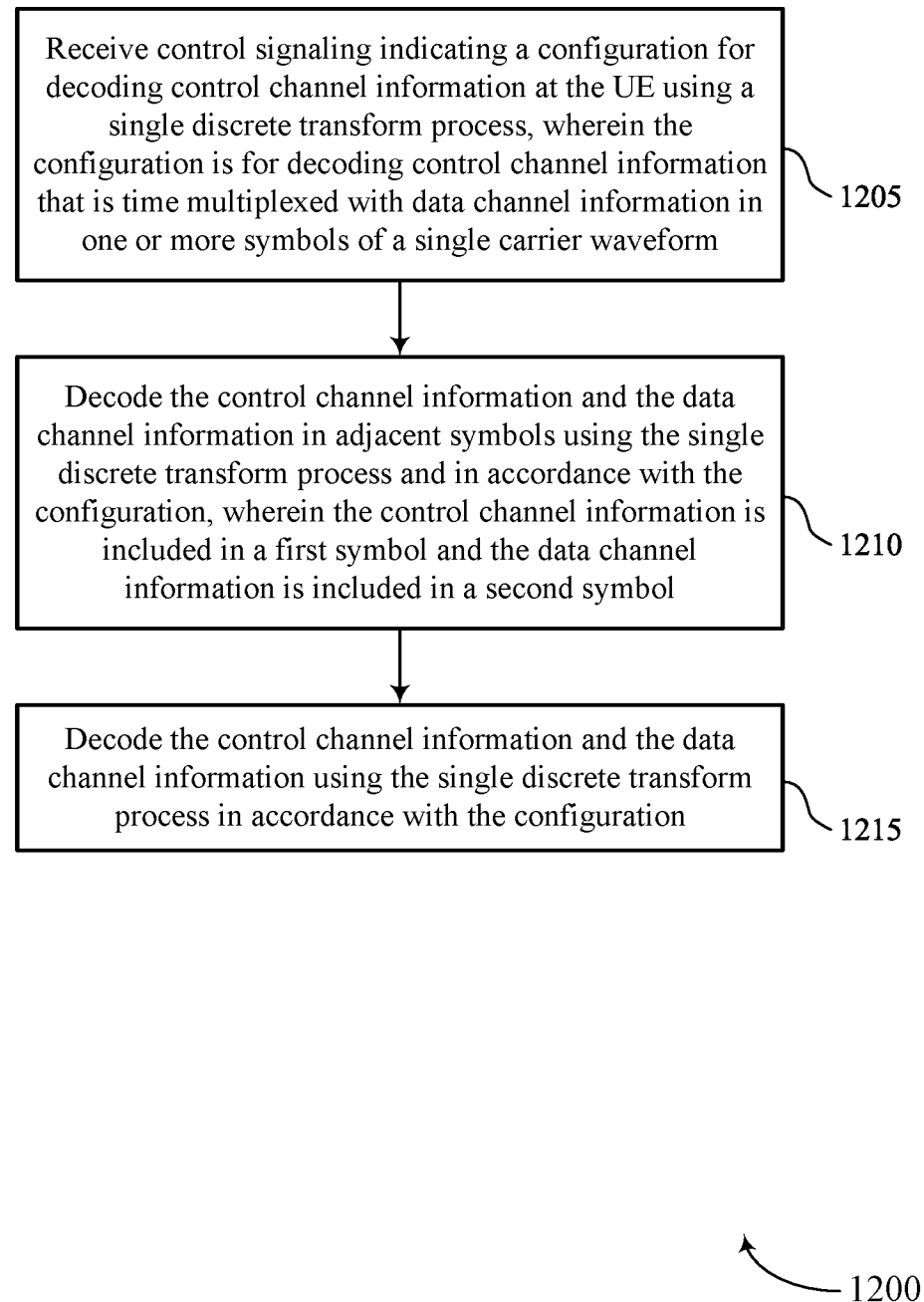

FIG. 12 shows a flowchart illustrating a method 1200 that supports control and data channel processing for higher bands in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1205, the method may include receiving control signaling indicating a configuration for decoding control channel information at the UE using a single discrete transform process, where the configuration is for decoding control channel information that is time multiplexed with data channel information in one or more symbols of a single carrier waveform. The operations of 1205 may be performed in accordance with examples as disclosed herein. In some examples, aspects of the operations of 1205 may be performed by a control signaling receive component 825 as described with reference to FIG. 8.

At 1210, the method may include decoding the control channel information and the data channel information in adjacent symbols using the single discrete transform process and in accordance with the configuration, where the control channel information is included in a first symbol and the data channel information is included in a second symbol. The operations of 1210 may be performed in accordance with examples as disclosed herein. In some examples, aspects of the operations of 1210 may be performed by a channel information decoding component 830 as described with reference to FIG. 8.

At 1215, the method may include decoding the control channel information and the data channel information using the single discrete transform process in accordance with the configuration. The operations of 1215 may be performed in accordance with examples as disclosed herein. In some examples, aspects of the operations of 1215 may be performed by a channel information decoding component 830 as described with reference to FIG. 8.

Figure 13:
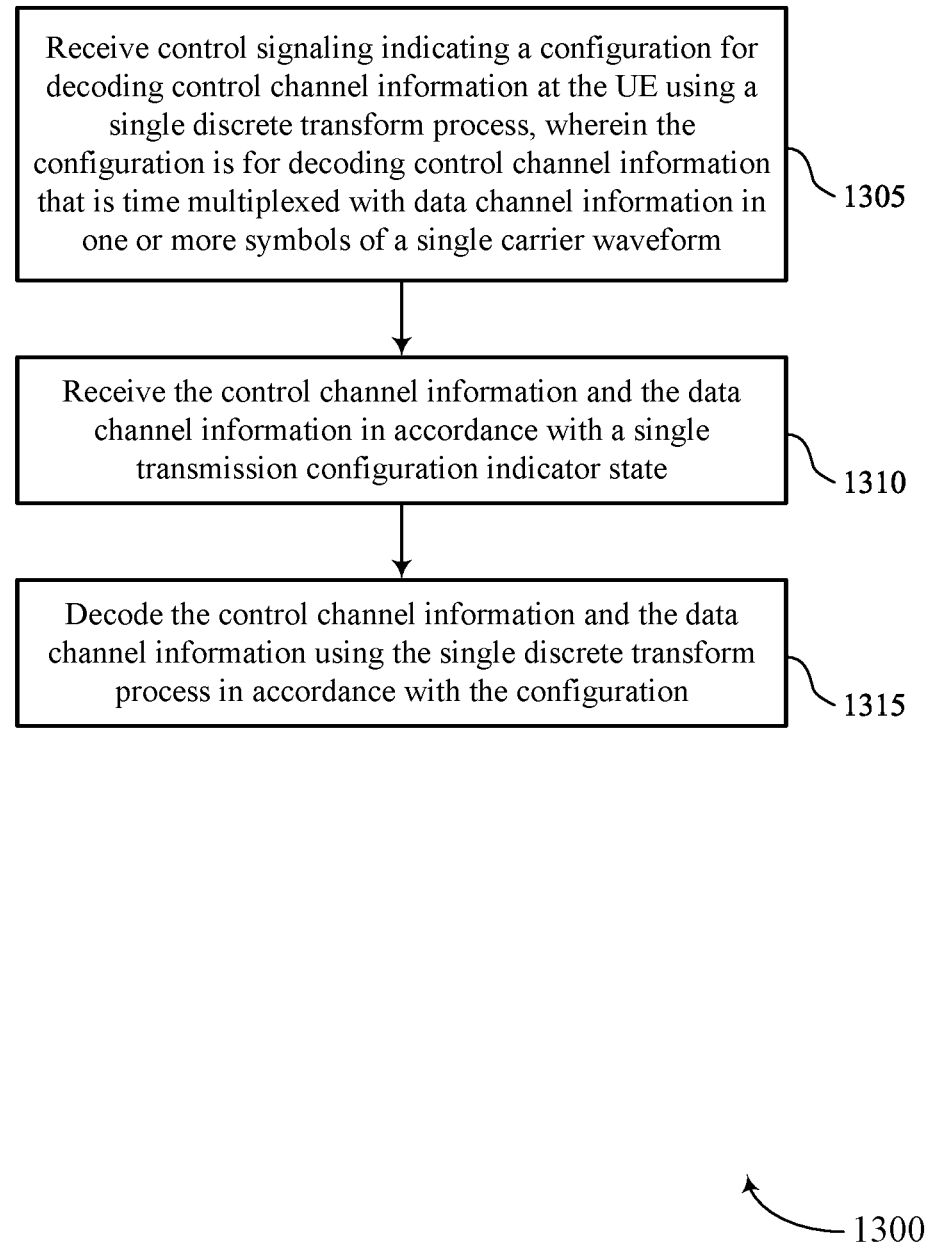

FIG. 13 shows a flowchart illustrating a method 1300 that supports control and data channel processing for higher bands in accordance with aspects of the present disclosure. The operations of the method 1300 may be implemented by a UE or its components as described herein. For example, the operations of the method 1300 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1305, the method may include receiving control signaling indicating a configuration for decoding control channel information at the UE using a single discrete transform process, where the configuration is for decoding control channel information that is time multiplexed with data channel information in one or more symbols of a single carrier waveform. The operations of 1305 may be performed in accordance with examples as disclosed herein. In some examples, aspects of the operations of 1305 may be performed by a control signaling receive component 825 as described with reference to FIG. 8.

At 1310, the method may include receiving the control channel information and the data channel information in accordance with a single transmission configuration indicator state. The operations of 1310 may be performed in accordance with examples as disclosed herein. In some examples, aspects of the operations of 1310 may be performed by a channel information receive component 840 as described with reference to FIG. 8.

At 1315, the method may include decoding the control channel information and the data channel information using the single discrete transform process in accordance with the configuration. The operations of 1315 may be performed in accordance with examples as disclosed herein. In some examples, aspects of the operations of 1315 may be performed by a channel information decoding component 830 as described with reference to FIG. 8.

Figure 14:
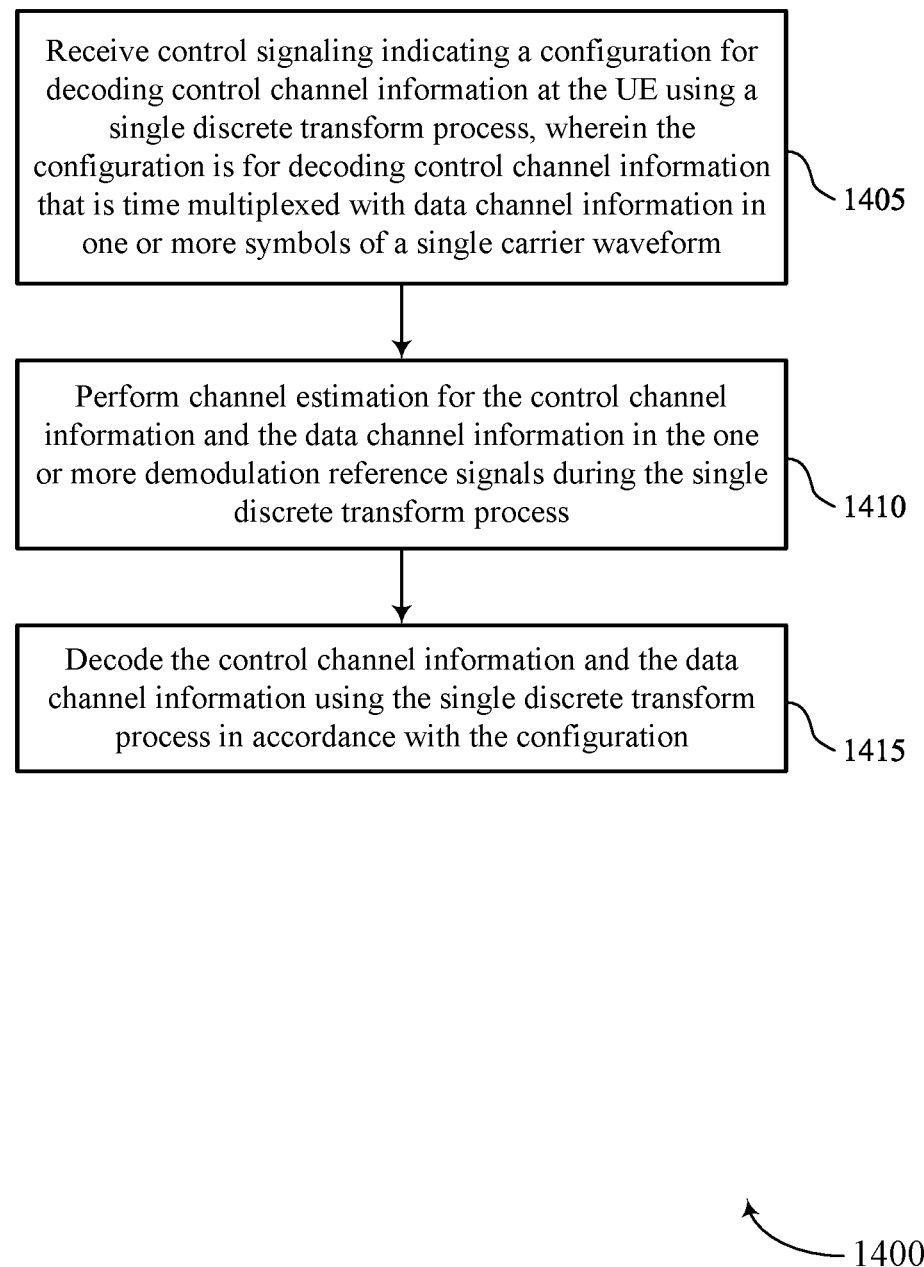

FIG. 14 shows a flowchart illustrating a method 1400 that supports control and data channel processing for higher bands in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving control signaling indicating a configuration for decoding control channel information at the UE using a single discrete transform process, where the configuration is for decoding control channel information that is time multiplexed with data channel information in one or more symbols of a single carrier waveform. The operations of 1405 may be performed in accordance with examples as disclosed herein. In some examples, aspects of the operations of 1405 may be performed by a control signaling receive component 825 as described with reference to FIG. 8.

At 1410, the method may include performing channel estimation for the control channel information and the data channel information in the one or more DMRSs during the single discrete transform process. The operations of 1410 may be performed in accordance with examples as disclosed herein. In some examples, aspects of the operations of 1410 may be performed by a channel estimation component 835 as described with reference to FIG. 8.

At 1415, the method may include decoding the control channel information and the data channel information using the single discrete transform process in accordance with the configuration. The operations of 1415 may be performed in accordance with examples as disclosed herein. In some examples, aspects of the operations of 1415 may be performed by a channel information decoding component 830 as described with reference to FIG. 8.

Figure 15:
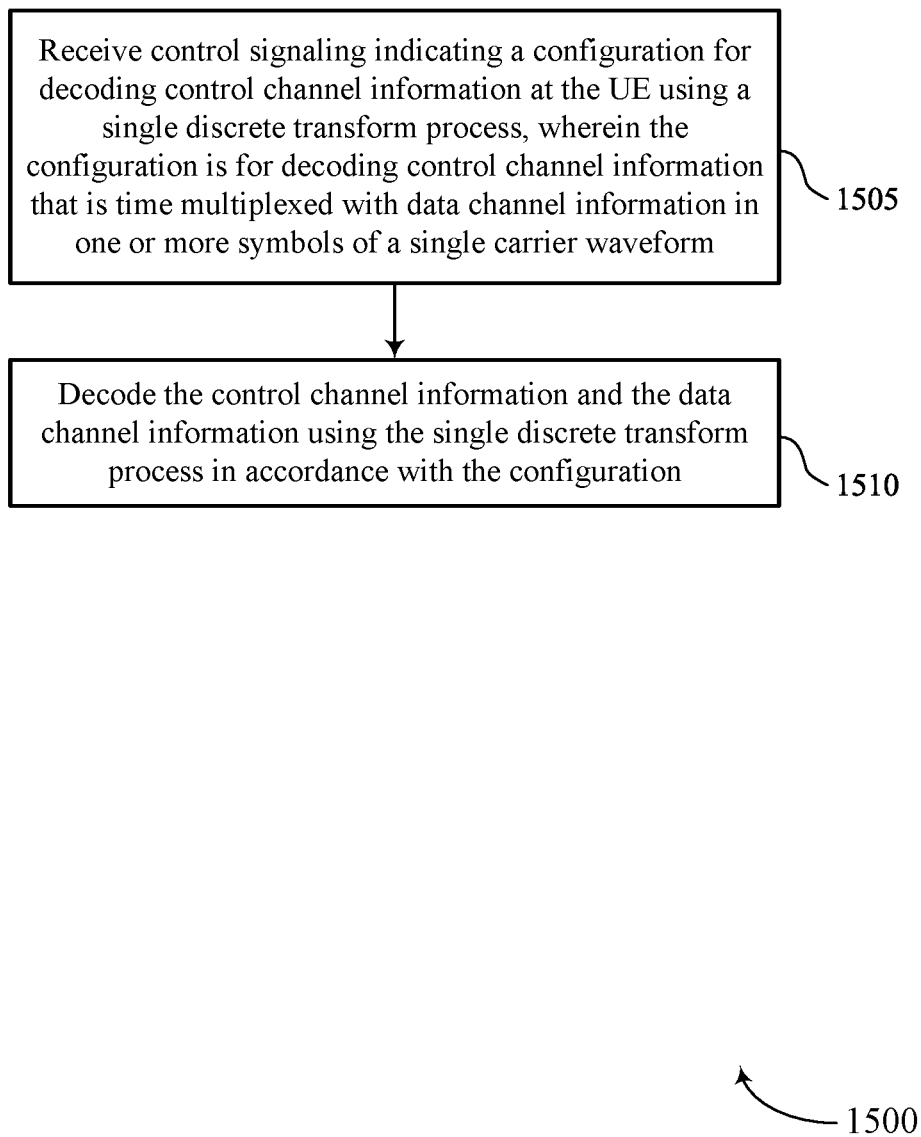

FIG. 15 shows a flowchart illustrating a method 1500 that supports control and data channel processing for higher bands in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving control signaling indicating a configuration for decoding control channel information at the UE using a single discrete transform process, where the configuration is for decoding control channel information that is time multiplexed with data channel information in one or more symbols of a single carrier waveform. The operations of 1505 may be performed in accordance with examples as disclosed herein. In some examples, aspects of the operations of 1505 may be performed by a control signaling receive component 825 as described with reference to FIG. 8.

At 1510, the method may include decoding the control channel information and the data channel information using the single discrete transform process in accordance with the configuration. The operations of 1510 may be performed in accordance with examples as disclosed herein. In some examples, aspects of the operations of 1510 may be performed by a channel information decoding component 830 as described with reference to FIG. 8.

The following provides an overview of aspects of the present disclosure:

Aspect 1: A method for wireless communications at a UE, comprising: receiving control signaling indicating a configuration for decoding control channel information at the UE using a single discrete transform process, wherein the configuration is for decoding control channel information that is time multiplexed with data channel information in one or more symbols of a single carrier waveform; and decoding the control channel information and the data channel information using the single discrete transform process in accordance with the configuration.

Aspect 2: The method of aspect 1, wherein decoding the control channel information and the data channel information using the single discrete transform process further comprises: performing a single channel estimation procedure for the control channel information and the data channel information over the one or more symbols based at least in part on the configuration.

Aspect 3: The method of any of aspects 1 through 2, wherein the single discrete transform process includes a single guard interval associated with the control channel information and the data channel information in the one or more symbols.

Aspect 4: The method of any of aspects 1 through 3, wherein the single discrete transform process includes a single cyclic prefix associated with the control channel information and the data channel information in the one or more symbols.

Aspect 5: The method of any of aspects 1 through 4, further comprising: decoding the control channel information and the data channel information in a single symbol using the single discrete transform process in accordance with the configuration.

Aspect 6: The method of any of aspects 1 through 5, further comprising: decoding the control channel information and the data channel information in adjacent symbols using the single discrete transform process and in accordance with the configuration, wherein the control channel information is included in a first symbol and the data channel information is included in a second symbol.

Aspect 7: The method of aspect 6, further comprising: operating using a first power level during the first symbol and a second power level during the second symbol based at least in part on the configuration, wherein the first power level is different from the second power level.

Aspect 8: The method of any of aspects 1 through 7, wherein the single discrete transform process is associated with a scheduling block in which the control channel information is contiguous with the data channel information and a guard period within the scheduling block.

Aspect 9: The method of any of aspects 1 through 8, wherein the control channel information corresponds to the data channel information and further corresponds to information associated with at least one additional data channel, the method further comprising: decoding the control channel information, the data channel information, and the information associated with at least one future data channel in accordance with the configuration, wherein the control channel information is associated with the data channel information and the at least one future data channel.

Aspect 10: The method of aspect 9, further comprising: decoding the control channel information, the data channel information, and the information associated with the at least one additional data channel based at least in part on the control channel information and additional control channel information received in a prior symbol.

Aspect 11: The method of any of aspects 1 through 10, further comprising: receiving the control channel information and the data channel information in accordance with a single transmission configuration indicator state.

Aspect 12: The method of any of aspects 1 through 11, wherein the single discrete transform process includes one or more demodulation reference signals that are multiplexed with the control channel information and the data channel information, the method further comprising: performing channel estimation for the control channel information and the data channel information in the one or more DMRSs during the single discrete transform process.

Aspect 13: The method of aspect 12, wherein one or more symbol gaps are included between symbols of the one or more DMRSs, the control channel information, and the data channel information.

Aspect 14: The method of any of aspects 1 through 13, wherein the control channel information comprises a single DCI associated with the UE or multiple DCI associated with at least the UE and one or more additional UEs.

Aspect 15: The method of any of aspects 1 through 14, wherein the control channel information and the data channel information are multiplexed on the single carrier waveform.

Aspect 16: The method of any of aspects 1 through 15, wherein the single discrete transform process comprises a DFT processing duration.

Aspect 17: An apparatus for wireless communications at a UE, comprising a processor; memory coupled with the processor; and instructions stored in the memory and executable by the processor to cause the apparatus to perform a method of any of aspects 1 through 16.

Aspect 18: An apparatus for wireless communications at a UE, comprising at least one means for performing a method of any of aspects 1 through 16.

Aspect 19: A non-transitory computer-readable medium storing code for wireless communications at a UE, the code comprising instructions executable by a processor to perform a method of any of aspects 1 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving control signaling indicating a configuration for decoding control channel information and data channel information at the UE using a single discrete transform process, wherein the configuration is for decoding the control channel information that is time multiplexed with the data channel information in one or more symbols of a single carrier waveform; and
   decoding the control channel information and the data channel information using the single discrete transform process during a single receiving discrete transform processing period for the UE in accordance with the configuration, the decoding the data channel information based at least in part on the control channel information of the single carrier waveform comprising modulation and coding scheme information for the data channel information of the single carrier waveform.

2. The method of claim 1, wherein decoding the control channel information and the data channel information using the single discrete transform process further comprises:
   performing a single channel estimation procedure for the control channel information and the data channel information over the one or more symbols based at least in part on the configuration.

3. The method of claim 1, wherein the single discrete transform process includes a single guard interval associated with the control channel information and the data channel information in the one or more symbols.

4. The method of claim 1, wherein the single discrete transform process includes a single cyclic prefix associated with the control channel information and the data channel information in the one or more symbols.

5. The method of claim 1, further comprising:
   decoding the control channel information and the data channel information in a single symbol using the single discrete transform process in accordance with the configuration.

6. The method of claim 1, further comprising:
   decoding the control channel information and the data channel information in adjacent symbols using the single discrete transform process and in accordance with the configuration, wherein the control channel information is included in a first symbol and the data channel information is included in a second symbol.

7. The method of claim 6, further comprising:
   operating using a first power level during the first symbol and a second power level during the second symbol based at least in part on the configuration, wherein the first power level is different from the second power level.

8. The method of claim 1, wherein the single discrete transform process is associated with a scheduling block in which the control channel information is contiguous with the data channel information and a guard period within the scheduling block.

9. The method of claim 1, wherein the control channel information corresponds to the data channel information and further corresponds to information associated with at least one additional data channel, the method further comprising:
   decoding the control channel information, the data channel information, and the information associated with at least one future data channel in accordance with the configuration, wherein the control channel information is associated with the data channel information and the at least one future data channel.

10. The method of claim 9, further comprising:
    decoding the control channel information, the data channel information, and the information associated with the at least one additional data channel based at least in part on the control channel information and additional control channel information received in a prior symbol.

11. The method of claim 1, further comprising:
    receiving the control channel information and the data channel information in accordance with a single transmission configuration indicator state.

12. The method of claim 1, wherein the single discrete transform process includes one or more demodulation reference signals that are multiplexed with the control channel information and the data channel information, the method further comprising:
  performing channel estimation for the control channel information and the data channel information in the one or more demodulation reference signals during the single discrete transform process.

13. The method of claim 12, wherein one or more symbol gaps are included between symbols of the one or more demodulation reference signals, the control channel information, and the data channel information.

14. The method of claim 1, wherein the control channel information comprises a single downlink control information associated with the UE or multiple downlink control information associated with at least the UE and one or more additional UEs.

15. The method of claim 1, wherein the control channel information and the data channel information are multiplexed on the single carrier waveform.

16. The method of claim 1, wherein the single discrete transform process comprises a discrete Fourier transform processing duration.

17. An apparatus for wireless communications at a user equipment (UE), comprising:
  one or more processors;
  one or more memories coupled with the one or more processors; and
  instructions stored in the one or more memories and executable by the one or more processors to cause the apparatus to:
    receive control signaling indicating a configuration for decoding control channel information and data channel information at the UE using a single discrete transform process, wherein the configuration is for decoding the control channel information that is time multiplexed with the data channel information in one or more symbols of a single carrier waveform; and
    decode the control channel information and the data channel information using the single discrete transform process during a single receiving discrete transform processing period for the UE in accordance with the configuration, the decoding the data channel information based at least in part on the control channel information of the single carrier waveform comprising modulation and coding scheme information for the data channel information of the single carrier waveform.

18. The apparatus of claim 17, wherein the instructions to decode the control channel information and the data channel information using the single discrete transform process are further executable by the one or more processors to cause the apparatus to:
  perform a single channel estimation procedure for the control channel information and the data channel information over the one or more symbols based at least in part on the configuration.

19. The apparatus of claim 17, wherein the single discrete transform process includes a single guard interval associated with the control channel information and the data channel information in the one or more symbols.

20. The apparatus of claim 17, wherein the single discrete transform process includes a single cyclic prefix associated with the control channel information and the data channel information in the one or more symbols.

21. The apparatus of claim 17, wherein the instructions are further executable by the one or more processors to cause the apparatus to:
  decode the control channel information and the data channel information in a single symbol using the single discrete transform process in accordance with the configuration.

22. The apparatus of claim 17, wherein the instructions are further executable by the one or more processors to cause the apparatus to:
  decode the control channel information and the data channel information in adjacent symbols using the single discrete transform process and in accordance with the configuration, wherein the control channel information is included in a first symbol and the data channel information is included in a second symbol.

23. The apparatus of claim 22, wherein the instructions are further executable by the one or more processors to cause the apparatus to:
  operate using a first power level during the first symbol and a second power level during the second symbol based at least in part on the configuration, wherein the first power level is different from the second power level.

24. The apparatus of claim 17, wherein the single discrete transform process is associated with a scheduling block in which the control channel information is contiguous with the data channel information and a guard period within the scheduling block.

25. The apparatus of claim 17, wherein the control channel information corresponds to the data channel information and further corresponds to information associated with at least one additional data channel, and the instructions are further executable by the one or more processors to cause the apparatus to:
  decode the control channel information, the data channel information, and the information associated with at least one future data channel in accordance with the configuration, wherein the control channel information is associated with the data channel information and the at least one future data channel.

26. The apparatus of claim 25, wherein the instructions are further executable by the one or more processors to cause the apparatus to:
  decode the control channel information, the data channel information, and the information associated with the at least one additional data channel based at least in part on the control channel information and additional control channel information received in a prior symbol.

27. The apparatus of claim 17, wherein the instructions are further executable by the one or more processors to cause the apparatus to:
  receive the control channel information and the data channel information in accordance with a single transmission configuration indicator state.

28. The apparatus of claim 17, wherein the single discrete transform process includes one or more demodulation reference signals that are multiplexed with the control channel information and the data channel information, and the instructions are further executable by the one or more processors to cause the apparatus to:
  perform channel estimation for the control channel information and the data channel information in the one or more demodulation reference signals during the single discrete transform process.

29. An apparatus for wireless communications at a user equipment (UE), comprising:
  means for receiving control signaling indicating a configuration for decoding control channel information and data channel information at the UE using a single discrete transform process, wherein the configuration is for decoding the control channel information that is time multiplexed with the data channel information in one or more symbols of a single carrier waveform; and means for decoding the control channel information and the data channel information using the single discrete transform process during a single receiving discrete transform processing period for the UE in accordance with the configuration, the decoding the data channel information based at least in part on the control channel information of the single carrier waveform comprising modulation and coding scheme information for the data channel information of the single carrier waveform.

30. A non-transitory computer-readable medium storing code for wireless communications at a user equipment (UE), the code comprising instructions executable by one or more processors to:

receive control signaling indicating a configuration for decoding control channel information and data channel information at the UE using a single discrete transform process, wherein the configuration is for decoding the control channel information that is time multiplexed with the data channel information in one or more symbols of a single carrier waveform; and decode the control channel information and the data channel information using the single discrete transform process during a single receiving discrete transform processing period for the UE in accordance with the configuration, the decoding the data channel information based at least in part on the control channel information of the single carrier waveform comprising modulation and coding scheme information for the data channel information of the single carrier waveform.

* * * * *